United States Patent Office 3,446,031
Patented May 27, 1969

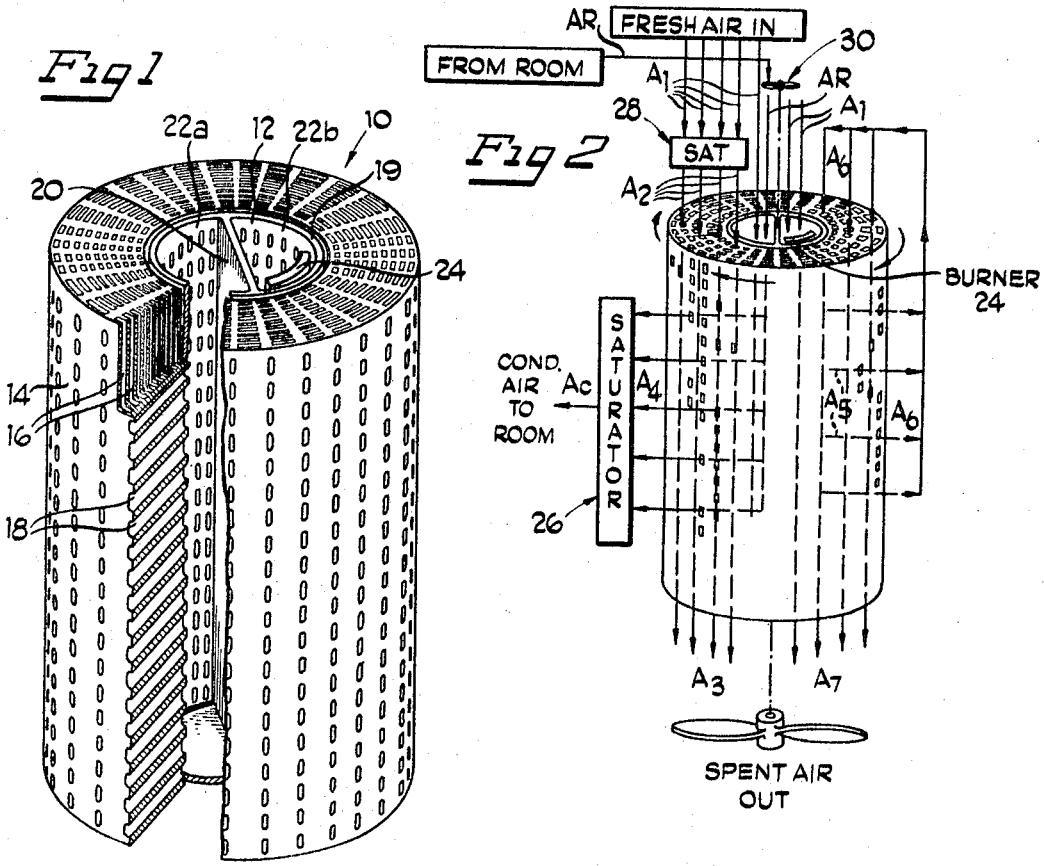
Fig 1
Fig 2
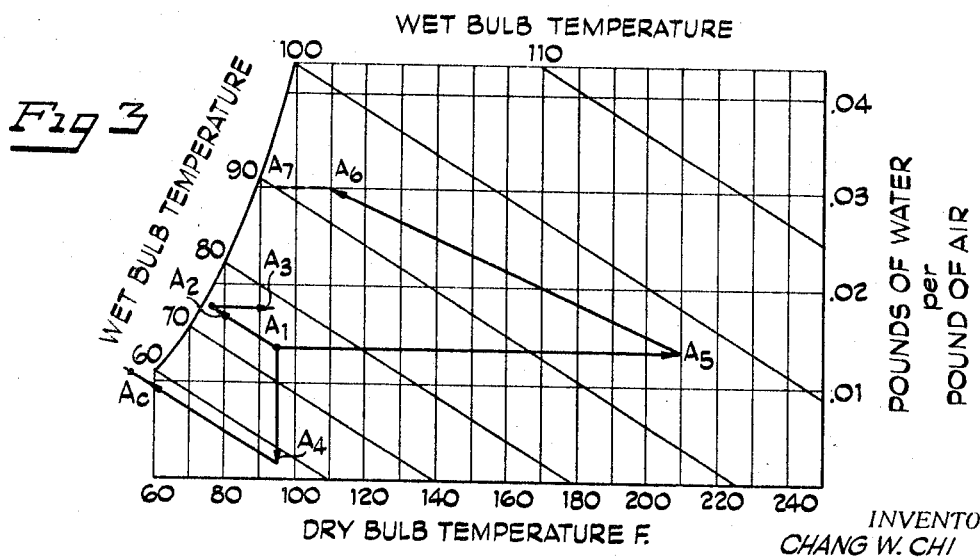
Fig 3
INVENTORS
CHANG W. CHI
ROBERT A. MACRISS
BY
Alexander & Speckman
ATTORNEYS

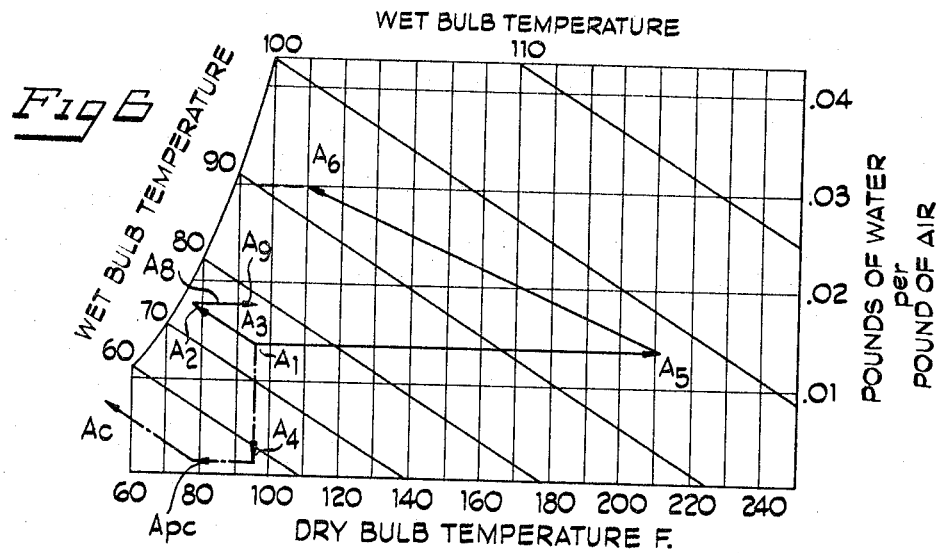
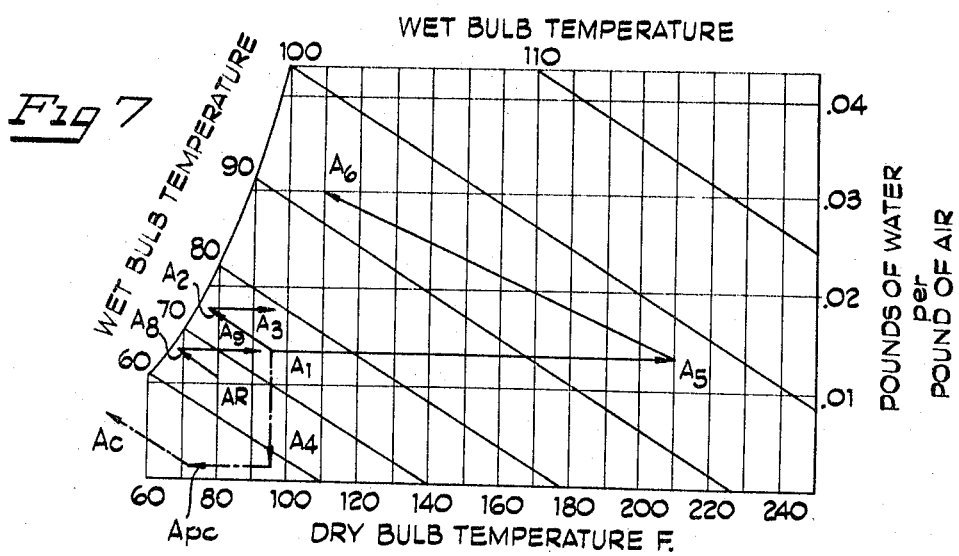

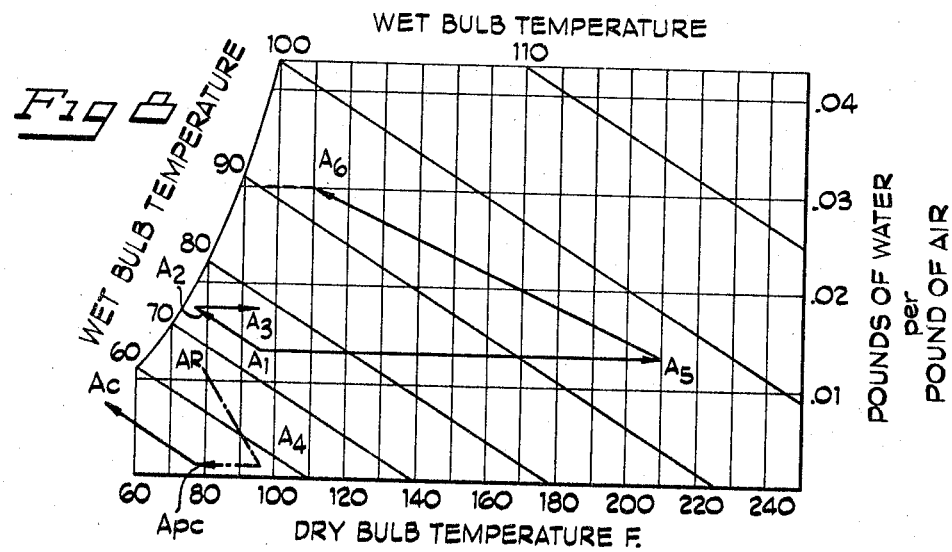
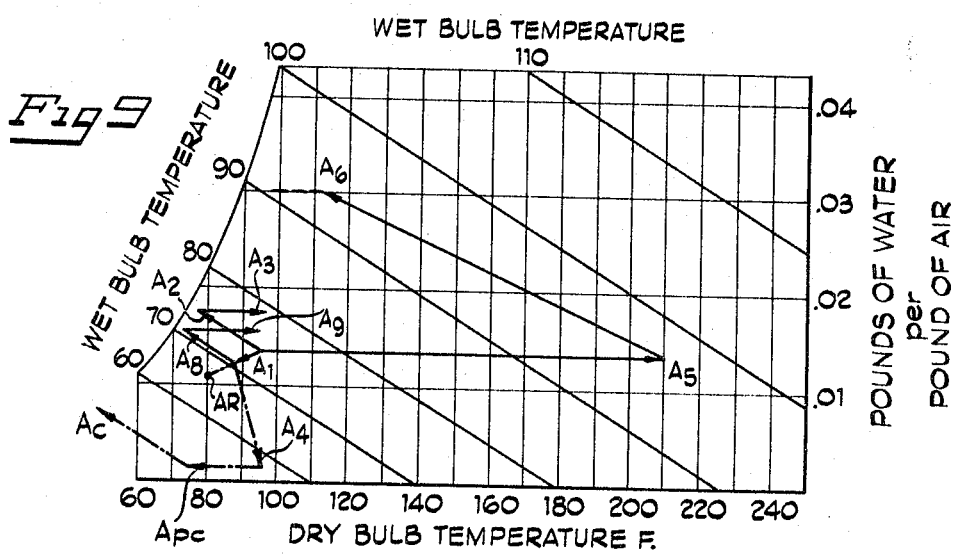

3,446,031
AIR CONDITIONING DEVICE USING ADSORPTION OF MOISTURE
Chang W. Chi, Chicago, and Robert A. Macriss, Deerfield, Ill., assignors to The Institute of Gas Technology, Chicago, Ill., a nonprofit corporation of Illinois
Filed Oct. 12, 1967, Ser. No. 674,876
Int. Cl. F25d 23/00, 17/06; F28d 19/00
U.S. Cl. 62—271     8 Claims

ABSTRACT OF THE DISCLOSURE

An open cycle air conditioning system having a composite S- and L-wheel arranged with vertical passages in heat exchange relation with horizontal passages, said horizontal passages having a solid adsorbent impregnated on the walls thereof. In one part of the wheel outside air passing through vertical passages cools horizontal passages in which room air is being dried while in another part of the wheel hot outside air that has passed through horizontal passages to dry the adsorbent passes through vertical passages to preheat horizontal passages which will be rotated to a position for drying of the adsorbent.

Background of the invention

This invention relates, in general, to air conditioning systems and, in particular, to improved open cycle air conditioning systems.

Open cycle air conditioners are well known in the art. One system, known as the Munters unit, is described in U.S. Patent No. 2,926,502. Basically, open cycle air conditioners like the Munters unit operate by dehumidification and subsequent cooling of air wherein warm, moist air is conditioned by a three-stage process to produce cool, relatively dry air.

The efficiency and effectiveness of an open cycle air conditioning system depends largely on the ability of the unit to dehumidify the warm, moist imput air. Although various dehumidification means have been employed with open cycle air conditioners, few, if any, provide the higher effective dehumidification necessary for efficient operation on air of exceptionally high temperature and humidity.

Improved open cycle air conditioning systems have been developed which have a design which permits them to operate more efficiently in hot, humid climates. Generally, these systems include a pair of S-wheels for transfer of sensible heat to and from air, an L-wheel for transfer of latent heat of condensation and evaporization, a heating section in the form of a gas-fired burner for heating the air passing through it, and a single evaporator.

The operation of one of the systems is such that air from the conditioned room is passed through one of the two S-wheels which raises the temperature of the air at constant absolute humidity. The heated air from that S-wheel is then passed through the L-wheel twice, to remove moisture from the air.

In this manner, the air can be dried more and, of equal importance, the size of the L-wheel, as well as the equipment, can be reduced. From the L-wheel, the dried air is passed through the second one of the S-wheels where it is cooled to near outdoor temperature, and then through the other one of the S-wheels again which cools it to near room temperature. The air from the S-wheel then is passed through the saturator where it is saturated with moisture to further cool it, and then to the conditioned room.

It may be noted that this system takes air from the conditioned space, rather than outdoor air, and dries it with the L-wheel. In most air-conditioning applications, indoor air contains less water vapor than outdoor air.

Accordingly, the L-wheel can be smaller in size, or can dry the air more, or both. A substantial improvement is provided since the system will operate more efficiently in hot, humid climates.

The improved systems of the present invention provide the advantages discussed above as well as additional improvements which constitute a significant advancement over the system heretofore known.

Summary of the invention

Accordingly, it is an object of the present invention to provide improved air conditioning systems, particularly open cycle air conditioning systems.

Another object is to provide improved open cycle air conditioning systems having a single composite S- and L-wheel.

Still another object is to provide improved systems of the above type which have substantially improved operation whereby the problems associated with the use of lithium chloride as the drying agent in high temperature high humidity areas are substantially, if not completely, eliminated.

A still further object is to provide improved systems of the above type wherein any fire hazard as a result of the burner and the S-wheel or wheels thereof being in close proximity is substantially, if not completely eliminated.

A still further object is to provide improved systems of the above type having a composite S- and L-wheel which is easily ducted and compact, so that the dimensions of the overall system equipment are the same as or less than those of presently available open cycle air conditioning systems.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings.

Description of the drawings

FIG. 1 is a sectional view of a composite S- and L-wheel, generally illustrating its construction particularly the vertical and horizontal sections thereof for heat exchange of air;

FIG. 2 is a diagrammatic view of a system employing the composite S- and L-wheel of FIG. 1, and further illustrating the passage of air through the wheel;

FIGS. 3 and 4 are psychrometric charts illustrating the changes of state of the air at various points in the system of FIG. 2 and a modification thereof, respectively;

FIGS. 6, 7, 8 and 9 are psychrometric charts illustrating the changes of state of the air at various points in the system of FIG. 5 and various modifications thereof, respectively.

Description of illustrated embodiments

Figure 4:
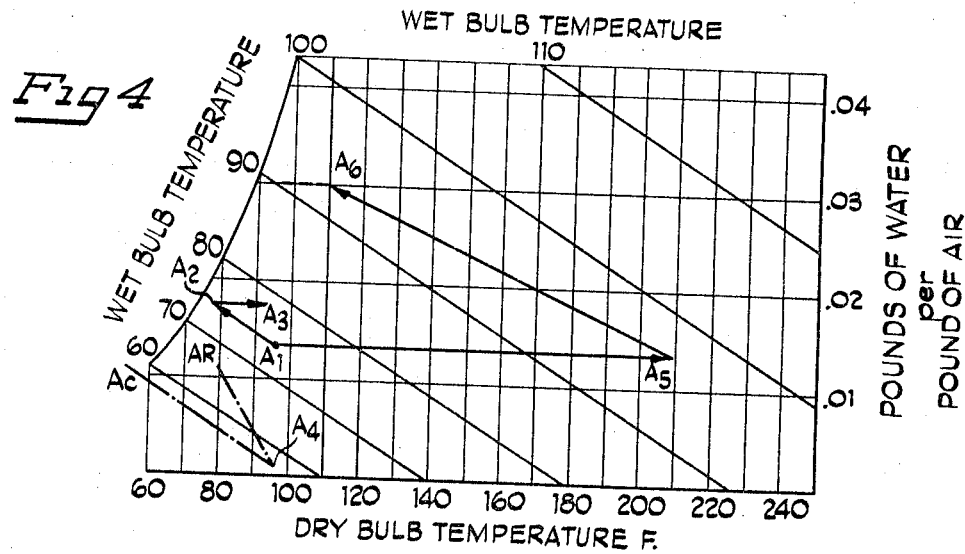

Referring now to the drawings, in FIG. 1 there is illustrated a cylindrically shaped composite S- and L-wheel 10 which may be fabricated of metal, ceramic or any suitable material. The wheel 10 has spaced-apart inner and outer walls 12 and 14, respectively. The space between the inner and outer walls is honeycombed, in any suitable manner, so as to provide a number of vertical and horizontal heat exchange passageways or sections generally represented by the reference numerals 16 and 18, respectively, which are separated from one another so as to permit air to flow in both a vertical and a horizontal direction through the wheel 10, in the manner described more fully below. These vertical and horizontal sections 16 and 18 can be provided by, for example, placing a number of cylinders which progressively decrease in diameter concentrically within one another and, thereafter, transversely extending a number of tubular members through the walls of the cylinders. Other methods also can be used. The wheel 10 rotates about a hollow cylindrically-shaped core 19 which is closed at its lower end (as shown) and which has a vane or partition wall 20 preferably centrally positioned therein, dividing it into two chambers 22a and 22b. The chambers 22a and 22b are in communication with various ones of the horizontal sections as the wheel 10 rotates, as will be more apparent from the description below. Heating means preferably in the form of a gas-fired burner 24 is fixedly disposed in one of the chambers 22a and 22b, in the illustrated case it is disposed in the chamber 22b, adjacent to its upper end (as shown), for heating air flowing into the chamber 22b.

The vertical sections 16 of the composite wheel 10 formed by the concentrically-arranged cylinders or other suitable means constitute the S-wheel portion of the composite wheel. The vertical sections 16 therefore are water-impervious so as to transfer sensible heat to and from air flowing through them. In conventional systems this is generally accomplished by coating the S-wheel with wax.

The horizontal sections 18 of the composite wheel 10 have a solid adsorbent such as lithium chloride or other hygroscopic substance capable of sorption of moisture from air passing thereover impregnated on the surfaces thereof.

With this construction in mind, the remaining structural features of the composite wheel 10 will become apparent from the description of the operation of the open cycle air conditioning system 11 set forth below, in combination with the diagrammatic illustration thereof, in FIG. 2.

Referring now to FIG. 2, outside air $A_1$ is caused to flow through the chamber 22a of the composite wheel 10, and from chamber 22a the air $A_1$ is further caused to flow through the horizontal sections 18 in communication with the chamber 22a. As the outside air $A_1$ flows through these horizontal sections 18, it is isothermally dehumidified by the solid adsorbents impregnated on the surfaces thereof, to $A_4$. The dried air $A_4$ next to ducted to and passed through a saturator 26 which humidifies it and thereby cools it to $A_c$. The air $A_c$ then is ducted to and expanded into the room to be conditioned.

Outside air $A_1$ also is simultaneously caused to flow through a saturator 28 which cools it by water saturation, to $A_2$. The cooled air $A_2$ from the saturator 28 then is passed through the vertical sections 16 interwoven with the horizontal sections 18 from which the air $A_4$ is derived. This air $A_2$ removes the heat generated by the adsorption of water vapor in these horizontal sections 18, and is rejected to outdoors through the lower end (as shown) of the composite wheel 10, as heated air $A_3$.

The horizontal sections 18, which are the drying portion of the wheel 10, are regenerated by drawing outside air $A_1$ into the chamber 22b of the composite wheel 10 by means of a fan 30, and passing it through the burner 24 to heat it, to $A_5$. The resulting heated air $A_5$ flows from the chamber 22b through the horizontal sections 18 in communication with the chamber 22b and, in doing so, regenerates the wet, solid adsorbents impregnated on the surfaces thereof. The spent air $A_6$ then is ducted and passed through the vertical sections 16 to pre-heat the incoming horizontal sections of the rotating composite wheel. Thereafter, it is rejected to the outdoors, as $A_7$. This completes the cycle.

In the above described cycle of operation, air from the conditioned room is not used, and a volume of air equivalent to the conditioned air expanded into the conditioned room is rejected to outdoors. Generally, this described cycle of operation corresponds substantially to the cycle of operation of most presently available or conventional open cycle air conditioning systems. The change of state of the air at the various points in the system are shown in the psychrometric chart of FIG. 3. The above described cycle of operation can be and preferably is modified to condition the air from the conditioned room, instead of outside air. This is accomplished merely by modifying the ductwork (not shown) so that room air $A_R$, rather than outside air $A_1$ is caused to flow in the chamber 22a of the composite wheel 10. The room air $A_R$ is dried as it passes through the horizontal sections 18, as described above, and is cooled by water evaporation, as it flows through the saturator 26. From the evaporator it is expanded into the room.

The regenerative cycle of the system is the same as described above. The change of state of the air at the various points in this modified system are shown in the psychrometric chart FIG. 4.

When the system 11, is modified to operation in this last described fashion, that is to act on room air, rather than outside air, it will operate more efficiently in hot humid climates since room air usually contains less water vapor than outdoor air. Accordingly, it can be dried more, with less fuel. The system 11 therefore also has a higher coefficient of performance than conventional systems.

The above described system of FIG. 2 can be further modified to use an arbitrary mixture of room air $A_R$ and $A_1$ are caused to flow simultaneously into the chamber 22a of the composite wheel 10. Thereafter, the cycle of operation is the same. As would be expected, the efficiency and coefficient of performance of such a system lies somewhere between those of the first described systems, depending upon the ratio of room air $A_R$ and outside air $A_1$ used.

Figure 5:
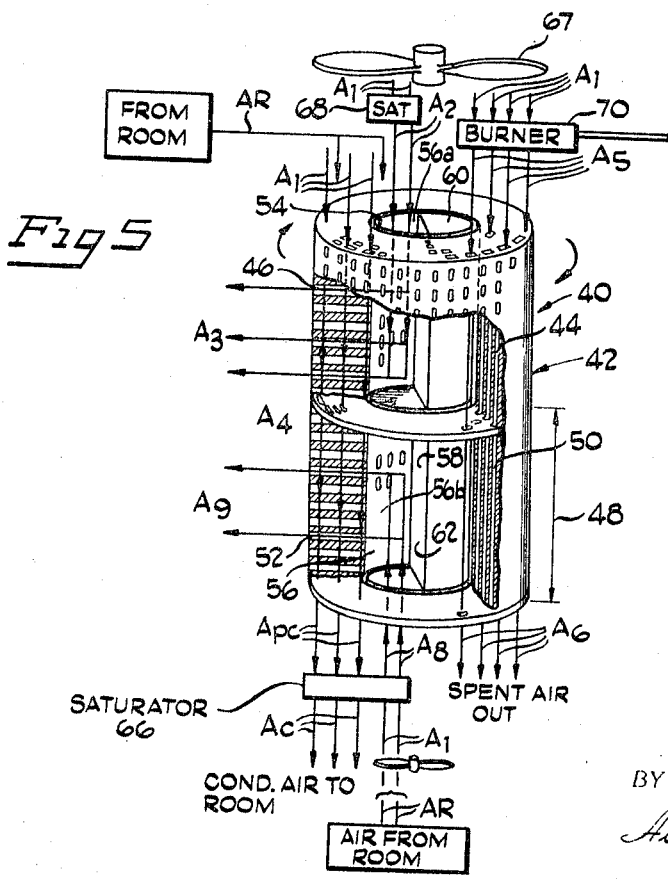
FIG. 5 is a diagrammatic view of another system employing a modified composite S- and L-wheel, and further illustrating the passage of air through the wheel.

In FIG. 5, there is disclosed another open cycle air conditioning system 40 which is diagrammatically illustrated and which includes a composite S- and L-wheel 42. The composite wheel 42 is generally like the composite wheel 10, however, in the composite wheel 40, the surfaces of the vertical sections 44 thereof are impregnated with solid absorbents. In the case of the composite wheel 40 then, the vertical sections 44 constitute the L-wheel portion thereof, while its horizontal sections 46 constitute the S-wheel portion thereof.

In addition, the composite wheel 42 has an extension, that portion generaly by the arrowheaded line 48 and hereinafter referred to as extension 48, on its lower end (as illustrated) which has vertical and a horizontal sections 50 and 52, respectively, which are like the vertical sections 44 and the horizontal sections 46.

The iner wall 54 of the composite wheel 42 forms a chamber 56 and the latter is divided by a partition wall 58 into an upper chamber 56a and a lower chamber 56b. Air entering either one of the chambers 56a and 56b is prevented from entering the other. The chambers 56a and 56b have deflection plates 60 and 62 affixed therein, for deflecting air flowing therein out through the horizontal sections in the left half (as shown) of the wheel 10 and for shielding the remaining ones of them.

Having now generally described the construction of the composite wheel 40, the operation of the system 40 can be described as follows. Outside air $A_1$, is caused to flow through the vertical sections 44 and 50 which are interwoven with the horizontal sections in communication with the chambers 56a and 56b through which the air is deflected and, in passing therethrough, is isothermally dehumidified by the solid adsorbents impregnated on the surfaces thereof. The dried air $A_4$ is cooled to $A_{pc}$ by heat exchange in the extension 48 of the composite wheel with cross flowing outside air $A_1$. This is accomplished by causing outside air $A_1$ to flow through a saturator 66 to pre-cool it, by water evaporation, to $A_8$. From the saturator the pre-cooled air $A_8$ is passed into the lower chamber 56a and is deflected through the horizontal sections 52 in communication with the chamber 56a. The pre-cooled air $A_8$ removes the heat generated by the absorption of water vapor in the vertical sections 50, and then is rejected to the outdoors, as heated air $A_9$.

The dry, pre-cooled air $A_{pc}$ is passed through the saturator 66, wherein it is further cooled to $A_c$ before it is expanded into the room to be conditioned.

The vertical sections 44 in the upper portion of the composite wheel 42 are cooled by heat exchange with outside air $A_1$ which is passed through a saturator 68 and cooled to $A_2$ before being passed into the chamber 56a. From the chamber 56a, the air $A_2$ is deflected through the horizontal sections 46, to remove the heat generated by the adsorption of water vapor in the vertical sections 44. Thereafter, it is rejected to the outdoors, as $A_3$.

To regenerate the vertical sections 44 and 50 of the composite wheel 42, outside air $A_1$ is drawn by a fan 67 past a burner 70 which heats it to $A_5$. It may be noted that the burner 70 is located externally of the composite wheel 42 in th system 40. From the burner 70, the hot air $A_5$ is passed through the vertical sections 44 and 50, and is rejected, as spent air $A_6$, at its lower end to the outdoors. In the above-described operation of the system 40, room air is not used, and a volume of room air equivalent to the conditioned air expanded into the room is rejected to outdoors. The changes of state at various points in the system are shwn in the psychrometric chart of FIG. 6.

The system 40 differs from the system 11 in that the dried air $A_4$ is further cooled to $A_{pc}$ before it is further cooled by the saturator 66 and expanded into the conditioned room. The system 40 therefore has improved efficiency over the system 11, as well as prior conventional systems.

The system 40 can be modified in several different fashions, to vary its coefficient of performance. For example, one such manner in which it can be modified is to cool the dried air $A_4$ in the lower portion or extension 48 of the composite wheel 42, by heat exchange with air $A_R$ from the conditioned room which is precooled to $A_8'$ by water evaporation with the saturator 66 before it is passed through the horizontal sections 52. The air $A_{pc}$ is thereby cooled to a greater degree. The heated air $A_9$ is rejected to the outdors. The psychrometric chart of FIG. 7 shows the changes in the state of the air at the variosu points in this modified system.

Another modification is to condition air from the conditioned room. In this case, room air $A_r$ rather than outside air $A_1$ is passed through the vertical sections 44 and 50 of the composite wheel 42, to the saturator 66. outside aid $A_1$ is used to cool the horizontal sections 46 and 52 and for regenerating purposes. The psychrometric chart of FIG. 8 shows the changes in the state of the air at various points in this last-mentioned system.

The operation of the system 40 when modified in this last-mentioned fashion can be equated to the operation of the above mentioned system disclosed in the previously filed patent application having an additional S-wheel incorporated thereinf or improved efficiency and coefficient of performance. The system 40 has a similarly improved operation and, furthermore, is improved by the use of the single composite wheel 42.

Still another modification is to mix a part of the room air $A_r$ with the outside air $A_1$ and simultaneously passing the same through the vertical sections 44 and 50 of the composite wheel 42. Room air $A_r$ also can be mixed with outside air $A_1$, and cooled to $A_8$ by the saturator 66 before it is passed through the horizontal sections 52 to cool the air $A_4$. The changes in the state of the air at various points in this system are shown in the psychrometric chart of FIG. 9.

It can be seen from the above description of the systems 11 and 40, and the various modifications which can be made to them, that the improved efficiency provided by the composite wheels 10 and 42 thereof, respectively, and the manner in which a cross flow of air is used to cool and dry the air substantially, if not completely, eliminates the problems associated with the use of lithium chloride as a drying agent in high temperature-high humidity areas. Also since the burners 24 and 70 are separated from the S-wheel portions of the composite wheels 11 and 42 and/or the fact that the composite wheels preferably are fabricated of metal, any fire hazards are eliminated. In each case, the composite wheels 11 and 42 can be made as compact units and can be easily ducted so that the equipment size can be the same or less than that of existing equipment.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An open cycle air conditioning system comprising, in combination: a composite S- and L-wheel having a plurality of vertical and horizontal sections through which air can flow, said vertical and horizontal sections each being separated from one another, said vertical sections being water-impervious so as to transfer sensible heat to and from air flowing through them and said horizontal sections having a solid adsorbent capable of sorption of moisture from air passing over it impregnated on the surfaces thereof; a first and a second saturator means for humidifying and cooling air passing through them; first means for causing air to flow through predetermined ones of said plurality of horizontal sections and from said horizontal sections to and through said first saturator means; second means for causing air to flow through said second saturator means and from said second saturator means to and through predetermined ones of said plurality of vertical sections; heating means for heating air; third means for causing air to flow passed said heating means, through predetermined other ones of said plurality of horizontal sections and through predetermined other ones of said plurality of vertical sections, said wheel being rotated with respect to said first, second and third means for causing air to flow through said vertical and horizontal sections in the defined manner whereby said predetermined ones of said plurality of vertical sections and said predetermined one of said horizontal sections are constantly changing as said wheel rotates.

2. The system of claim 1 wherein said solid adsorbent impregnated on the surfaces of said horizontal sections comprises lithium chloride.

3. The system of claim 1 wherein the air caused to flow through predetermined ones of said horizontal sections comprises air from a conditioned room.

4. The system of claim 1 wherein said composite S- and L-wheel comprises a cylindrical-shaped annular body portion in which said plurality of vertical and horizontal sections are formed, a hollow cylindrical-shaped support which is closed at one end within the core of said annular body portion about which said annular body portion rotates, a partition wall within said support dividing the same into two air chambers each of which is in communication with said plurality of horizontal sections within said body portion, said first means for causing air to flow through predetermined ones of said plurality of horizontal sections being adapted to direct said air through one of said two chambers within said support to said ones of said horizontal sections, said heating means being disposed within the other one of said two chambers near the end thereof, and said third means causing air to flow passed said heating means and into the other one of said two chambers.

5. An open cycle air conditioning system comprising, in combination: a composite S- and L-wheel having a central hollow core and a plurality of vertical and horizontal sections through which air can flow, said vertical and horizontal sections each being separated from one another, said horizontal sections being water-impervious so as to transfer sensible heat to and from air flowing through them and said vertical sections having a solid adsorbent capable of sorption of moisture from air passing over it impregnated on the surfaces thereof, closure means within said hollow core dividing the same into an upper chamber and a lower chamber; a first and second saturator means for humidifying and cooling air passing through them; first means for causing air to flow through predetermined ones of said plurality of vertical sections and from said vertical sections to and through said first saturator means; deflecting means within said upper and lower chambers for deflecting air therein through predetermined ones of said plurality of horizontal sections in communication with said upper and lower chambers, respectively; second means for causing air to flow through said first saturator means into said lower chamber to and through said predetermined ones of said plurality of horizontal sections; means for causing air to flow through said second saturator means into said upper chamber to and through said predetermined ones of said plurality of horizontal sections; heating means for heating air passing through it; and third means for causing air to flow through said heating means into and through predetermined other ones of said plurality of vertical sections, said wheel being rotated with respect to said first, second and third means for causing air to flow through said vertical and horizontal sections in the defined manner whereby said predetermined ones of said plurality of vertical sections and said predetermined ones of said plurality of horizontal sections are constantly changing as said wheel rotates.

6. The system of claim 5 wherein said solid adsorbent impregnated on the surfaces of said vertical sections comprises lithium chloride.

7. The system of claim 5 wherein the air caused to flow by said first means and said second means comprises air from a conditioned room.

8. The system of claim 5 wherein said composite S- and L-wheel comprises a cylindrical-shaped annular body in which said plurality of vertical and horizontal sections are formed, a closure plate with the core of said annular body dividing said core into an upper and a lower chamber, and deflecting means within said upper and lower chambers for deflecting air through predetermined ones of the horizontal sections in communication with said upper and lower chambers, respectively.

References Cited

UNITED STATES PATENTS

| | | | |
|---|---|---|---|
| 2,926,502 | 3/1960 | Munters et al. | 62—94 |
| 2,993,563 | 7/1961 | Munters et al. | 55—34 |
| 3,009,540 | 11/1961 | Munters | 55—34 |
| 3,009,684 | 11/1961 | Munters | 165—7 X |
| 3,176,446 | 4/1965 | Siggelin | 55—390 X |

ROBERT A. O'LEARY, *Primary Examiner.*

A. W. DAVIS, *Assistant Examiner.*

U.S. Cl. X.R.

55—34, 78, 269; 62—94; 165—7